United States Patent [19]
Stoner et al.

[11] Patent Number: 5,949,068
[45] Date of Patent: Sep. 7, 1999

[54] OPTICAL READER FOR SCANNING OPTICAL INDICIA BY WAY OF VARYING OBJECT DISTANCE

[75] Inventors: Paul Douglas Stoner, North Canton, Ohio; Timothy P. O'Hagan, The Woodlands, Tex.

[73] Assignee: Telxon Corporation, Akron, Ohio

[21] Appl. No.: 08/946,028

[22] Filed: Oct. 7, 1997

[51] Int. Cl.$^6$ ...................................................... H01J 3/14
[52] U.S. Cl. .................................. 250/234; 235/472.01
[58] Field of Search ................................... 250/234, 236; 235/472.01, 462.01, 462.11, 462.111; 382/313

[56] References Cited

U.S. PATENT DOCUMENTS

| | | |
|---|---|---|
| 3,453,419 | 7/1969 | Torrey . |
| 3,636,317 | 1/1972 | Torrey . |
| 3,812,325 | 5/1974 | Schmidt . |
| 3,860,794 | 1/1975 | Knockeart et al. . |
| 3,931,524 | 1/1976 | Herrin ........................................ 250/566 |
| 4,093,865 | 6/1978 | Nicki ......................................... 250/566 |
| 4,282,425 | 8/1981 | Chadima, Jr. et al. . |
| 4,387,297 | 6/1983 | Swartz et al. . |
| 5,130,520 | 7/1992 | Shepard et al. . |
| 5,484,990 | 1/1996 | Lindacher et al. . |
| 5,815,300 | 9/1998 | Ohkawa et al. .......................... 359/216 |

Primary Examiner—Que T. Le
Attorney, Agent, or Firm—Renner, Otto, Boisselle & Sklar, P.L.L.

[57] ABSTRACT

An optical reader for reading optical indicia includes an imaging element for forming an image of the optical indicia; a photodetector element having an aperture with a width smaller than the width of a smallest element in the image to be discerned by the optical reader; and optical means for causing the image to be swept past the aperture to produce an output of the photodetector indicative of the optical indicia. The optical reader also may include an optical element which varies an image distance between the imaging element and the photodetector with respect to time to correspondingly vary an object distance at which the optical indicia is located from the imaging element in order that the image is focused at the image plane.

10 Claims, 2 Drawing Sheets

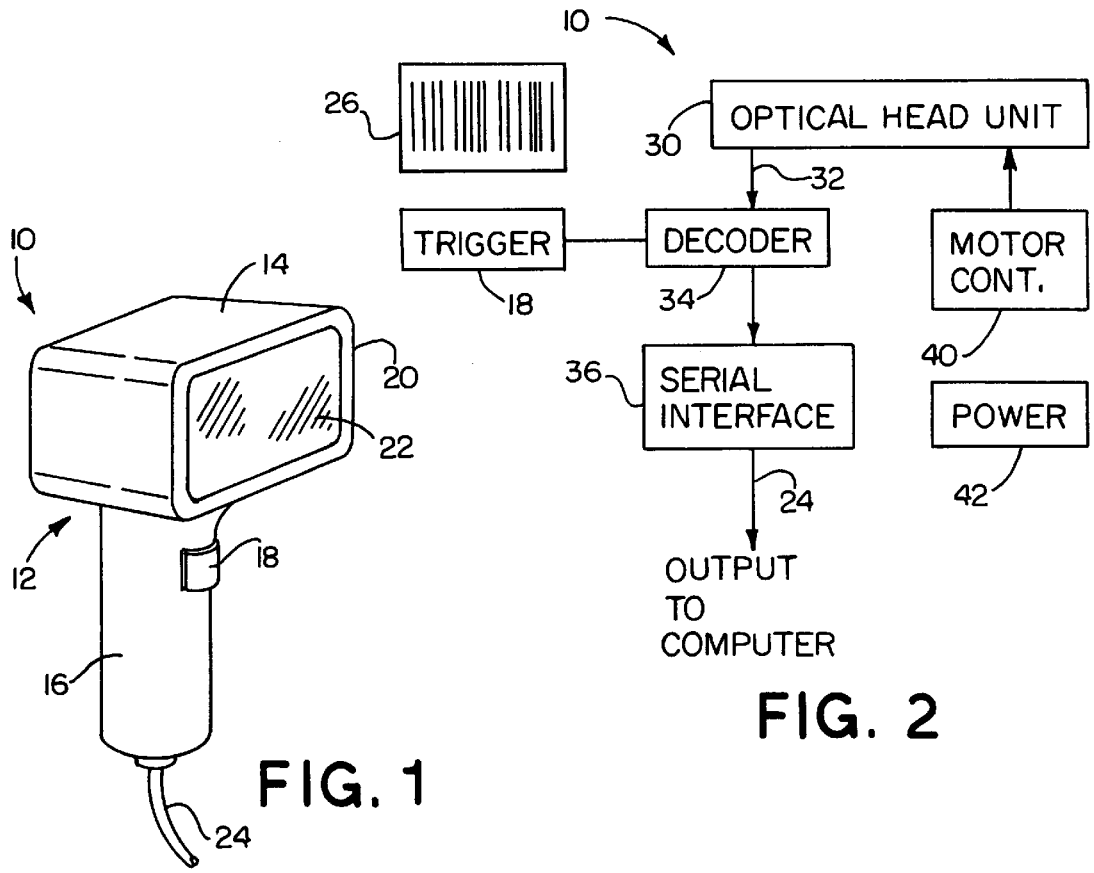
FIG. 1
FIG. 2
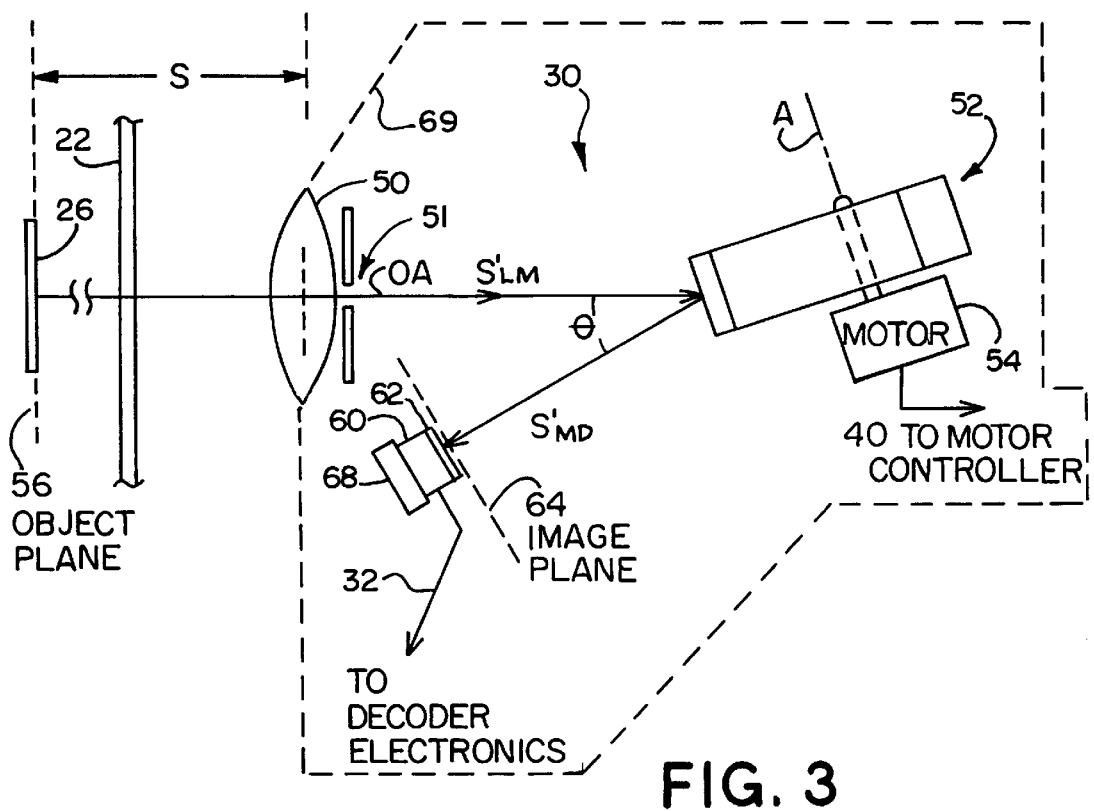
FIG. 3

OPTICAL READER FOR SCANNING OPTICAL INDICIA BY WAY OF VARYING OBJECT DISTANCE

TECHNICAL FIELD

The present invention relates generally to optical readers, and more particularly to image-based optical readers for scanning and decoding optical indicia such as bar code symbols and the like.

BACKGROUND OF THE INVENTION

Optical readers for scanning and decoding bar code symbols are generally known. A typical optical reader scanning system includes a light source, such as a laser, for providing a light beam; an optical system for scanning the light beam in a predetermined pattern throughout a defined scanning region. In addition, the scanning system includes a detection system for detecting light having at least a predetermined intensity reflected from the bar code symbol and for providing an electrical signal in response to detection of such reflected light. Moreover, an optical system is included for directing light from the scanned light beam that is reflected from the bar code symbol to the detection system.

Recently, optical readers using one-dimensional and two-dimensional multi-photosensor array charge-coupled devices (CCDs) have become more and more prevalent. The multi-photosensor array CCDs are used to image an entire bar code symbol, and the resultant electronic image is then processed using pattern recognition techniques to decode the bar code symbol.

Both laser-based optical readers and CCD-based optical readers perform adequately. However, laser-based optical readers at times experience regulatory problems, can draw an unacceptable amount of electrical power and are subject to strict optical alignment requirements. CCD-based optical readers are at present still too expensive to enjoy widespread usage and have a very limited depth of field. The CCDs themselves are relatively expensive. In addition, significant computational power is required to decode in a timely manner.

In view of the aforementioned shortcomings associated with current optical readers, there is a strong need in the art for an optical reader which does not suffer from some of the same drawbacks as conventional optical readers. For example, there is a strong need in the art for an optical reader which does not require a laser or a CCD. Moreover, there is a strong need in the art for an image-based optical reader which is able to image and decode the bar code symbol even over a wide range of object distances between the optical reader and the bar code symbol.

SUMMARY OF THE INVENTION

According to one aspect of the invention, an optical reader is provided for reading optical indicia. The optical reader includes an imaging element for forming an image of the optical indicia; a photodetector element having an aperture with a width smaller than the width of a smallest element in the image to be discerned by the optical reader; and means for causing the image to be swept past the aperture to produce an output of the photodetector indicative of the optical indicia.

According to another aspect of the invention, an optical reader is provided for reading optical indicia. The optical reader includes an imaging element for forming an image of the optical indicia at an image plane defined in relation to the location of a photodetector; and an optical element which varies an image distance between the imaging element and the photodetector with respect to time to correspondingly vary an object distance at which the optical indicia is located from the imaging element in order that the image is focused at the image plane.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 is a perspective view of an optical reader in accordance with an embodiment of the present invention;

FIG. 2 is a system level block diagram of the optical reader in accordance with the present invention;

FIG. 3 is a partial schematic, plan view of the optical reader in accordance with the present invention;

DESCRIPTION OF THE PREFERRED EMBODIMENTS

Figure 4:
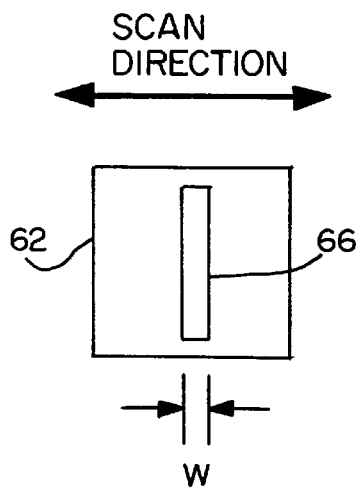
FIG. 4 is a schematic representation of a photodetector aperture in accordance with the present invention.

The present invention will now be described with reference to the drawings, wherein like reference labels are used to refer to like elements throughout.

Referring initially to FIG. 1, an optical reader in accordance with the present invention is designated generally at 10. The optical reader 10 in the exemplary embodiment includes a portable, hand-held sized housing 12 which contains the optics and electronics for the reader as described below in connection with FIGS. 2 and 3. The housing 12 includes a main head unit 14 fixedly attached to a handle portion 16. The handle portion 16 is sized to allow an operator to grasp the optical reader 10 in one hand and point the optical reader at some type of optical indicia such as a bar code symbol. The handle portion 16 includes a trigger 18 which can be depressed by the finger of an operator for initiating a scanning operation.

The front of the main head unit 14 includes an aperture 20 covered by a protective window 22 such as glass or the like. The front of the main head unit 14 is pointed in the direction of the bar code symbol or other optical indicia to be read. As will be described in more detail below in connection with FIG. 3, the bar code symbol or other optical indicia is imaged through the window 22 by an imaging lens within the optical reader. The optically transparent window 22 functions to protect the housing 12 from dust or debris, while permitting light from the bar code symbol or other optical indicia to pass through the window 22 so that it may be imaged by the imaging lens.

The optical reader 10 decodes the information which is read from the bar code symbol or other optical indicia.

Thereafter, the optical reader 10 outputs the decoded information to a data terminal, host computer, or the like via an electrical cable 24 extending from the base of the housing 12. Alternatively, the optical reader 10 may include a radio or other wireless communication transceiver for wirelessly communicating the decoded information to a data terminal or the like.

FIG. 2 illustrates the various primary components which are found in the optical reader 10. optical reader 10 will be described primarily in the context of reading a bar code symbol 26, however it will be appreciated that the optical reader 10 can be used to read various types of optical indicia.

As shown in FIG. 2, the optical reader 10 includes an optical head unit 30 which contains the appropriate optics as illustrated in FIG. 3 and described more fully below. The optical head unit 30 outputs an electrical signal based on the light received from the bar code symbol 26. Such output from the optical head unit 30 is provided on line 32 to a decoder 34. The decoder 34 is enabled by the trigger 18 and operates in conventional manner to correlate to the signal provided on line 32 and to decode the information included in the bar code symbol 26. Upon successfully decoding the bar code symbol 26, the decoder 34 provides the decoded information to a serial interface 36 which outputs the decoded information to a data terminal, computer, etc., via the electrical cable 24 or wireless transceiver or the like.

The optical reader 10 further includes a motor controller 40 for controlling a motor which rotates a mirrored spinner included in the optical head unit 30. In addition, the optical reader 10 includes a power supply 42 for providing the appropriate power to the respective elements within the optical reader 10. Such power supply 42 may consist of electrical power provided by the electrical cable 24. Alternatively, the power supply may include a rechargeable battery pack.

FIG. 3 is a plan view of the optical head unit 30 representing the optical orientation of the relevant components. The optical head 30 includes an imaging lens 50 for forming an image of the bar code symbol 26 through an aperture 51 adjacent the imaging Lens 50. The size of the aperture 51 may be selected to provide a desired f# for the optic system as will be appreciated.

Figure 5:
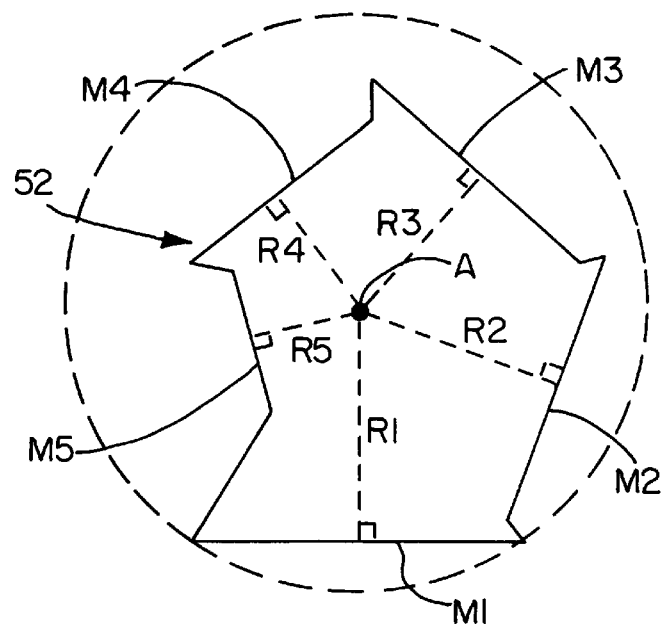
FIG. 5 is a top view of a multi-face rotating mirror used in accordance with the present invention.

In addition, the optical head 30 includes a mirrored spinner 52 rotated about an axis A by a motor 54. The mirrored spinner reflects the imaged light received from the imaging lens 50 towards a photodetector 60 included in the optical head unit 30. The mirrored spinner 52, shown in top view in FIG. 5, includes a plurality of mirrored faces (e.g., M1–M5) which extend parallel to the rotation axis A. As is shown in FIG. 5, each mirrored face M1–M5 is respectively positioned at a different radius (e.g., R1–R5) from the rotation axis A with the mirrored face M1–M5 oriented perpendicular to the corresponding radius R1–R5. In the exemplary embodiment, R1>R2>R3>R4>R5.

As will be described more fully below, the mirrored faces M1–M5 each being located at a different radius R1–R5 from the rotation axis A results in a variation in the object distance s between the imaging lens 50 and the object plane 56. Depending on which mirrored face M1–M5 is in optical series with the imaging lens 50 at a given moment in time, the object distance s will vary over time between a plurality of locations. This allows a bar code symbol 26 to be read by the optical reader 10 without requiring an operator to position the optical reader 10 at the same distance from a bar code symbol 26 each time a bar code symbol 26 is to be read.

In the exemplary embodiment, the mirrored spinner 52 has five faces M1–M5. However, it will be appreciated that in another embodiment a different number of faces may be used. Each face will result in the imaging of the bar code symbol 26 from a different object distance s, and depending on the desired range an appropriate number of faces may be included. Continuing to refer to FIG. 5, the mirrored spinner 52 may be weighted as needed in order to balance the weight of the spinner 52 about the rotation axis A.

Returning to FIG. 3, the photodetector 60 is made up of a conventional element such as a photodiode for receiving light reflected by the mirrored spinner 52. The photodetector 60 is positioned with an aperture plate 62 at the image plane 64 of the optical head unit. According to the present invention, the image of the bar code symbol 26 is formed by the imaging lens 50 at the image plane 64. The rotation of a given mirrored face M1–M5 about the rotation axis A causes the image to sweep across the aperture plate 62 within the image plane 64. As shown in FIG. 4, the aperture plate 62 includes an aperture 66 having a width W which is less than the lowest expected bar width at the image plane 64. Accordingly, as the image of the bar code symbol 26 from a given mirrored face M1–M5 is swept across the aperture plate 62 as the mirrored spinner 52 rotates about the axis A, the output of the photodetector 60 will vary in relation to the presence of bars or spaces in the bar code symbol 26. The output from the photodetector 60 is provided via line 32 to the decoder 34 (FIG. 2) where it can then be processed in conventional fashion.

The photodetector 60 may have affixed thereto a Peltier cooler 68 for increasing the sensitivity of the photodetector 60. Although not necessary to the invention, the Peltier cooler 68 increases the sensitivity of the photodetector 60 such that the optical reader 10 can be used even under very low level lighting conditions. Such a cooler 68 is commercially available, for example, from Melcor, Trenton, N.J.

The optical head unit 30 preferably further includes a dark room type housing 69 (represented by dashed line) to prevent unwanted ambient illumination from reaching the photodetector 60. As a result, a high signal to noise ratio may be achieved. The dark room type housing 69 is made of lightweight opaque material such as plastic coated with black paint.

As shown in FIG. 4, the imaging lens 50 receives light from the bar code symbol 26 which theoretically is located an object distance s from the imaging lens 50. The mirrored spinner 52 is located along the optical axis OA of the imaging lens 50, but is tilted slightly by an angle θ. As a result, the optical path from the imaging lens 50 is reflected and thereby folded over by the respective mirrored face M1–M5 of the mirrored spinner 52 in order that the image of the bar code symbol 26 is formed at the image plane 64 adjacent to the photodetector 60.

It will be appreciated that the image distance s' between the imaging lens 50 and the image plane 64 includes the distance $S'_{LM}$ between the imaging lens 50 and the particular mirrored face M1–M5 which is in optical series with the imaging lens 50 at a given moment. In addition, the image distance s' includes the distance $s'_{MD}$ between the particular mirrored face M1–M5 and the image plane 64. As a result, the image distance s' can be represented as follows:

$$s' = s'_{LM} + s'_{MD}$$

Of course, the distance $s'_{LM} + s'_{MD}$ will change as a function of which particular mirrored face M1–M5 is functioning to reflect light from the imaging lens 50 as the mirrored spinner 52 rotates during a reading operation. By selecting the appropriate radii R1–R5 for the respective mirrored faces and by positioning the mirrored spinner 52 a predetermined distance $s'_{LM}$ from the imaging lens 50, the mirrored spinner 52 can provide up to m predefined image distances s', where m is the number of faces on the mirrored spinner (e.g., five).

According to the lens formula, $$\frac{1}{s} + \frac{1}{s'} = \frac{1}{f}$$

where s is the object distance, s' is the image distance, and f is the focal length. In the exemplary embodiment, the focal length f of the imaging lens 50 is fixed based on the selection of a particular lens. By selecting different values for the image distance s' as determined by the particular values of $s'_{LM}+s'_{MD}$ for the respective mirrored faces M1–M5, for example, different object distances s are obtained by the optical reader 10. Using, as an example, an imaging lens 50 with a focal length of 28 mm, the following object distances $s_1$–$s_5$ as set forth in the following table can be obtained.

TABLE

| Mirrored Face | $s'_{LM} + s'_{MD}$ (mm) | s (mm) |
| --- | --- | --- |
| M1 | 20 | $s_1 = 69$ |
| M2 | 23 | $s_2 = 128$ |
| M3 | 25 | $s_3 = 232$ |
| M4 | 26 | $s_4 = 362$ |
| M5 | 28 | $s_5 = \infty$ |

Figure 6:
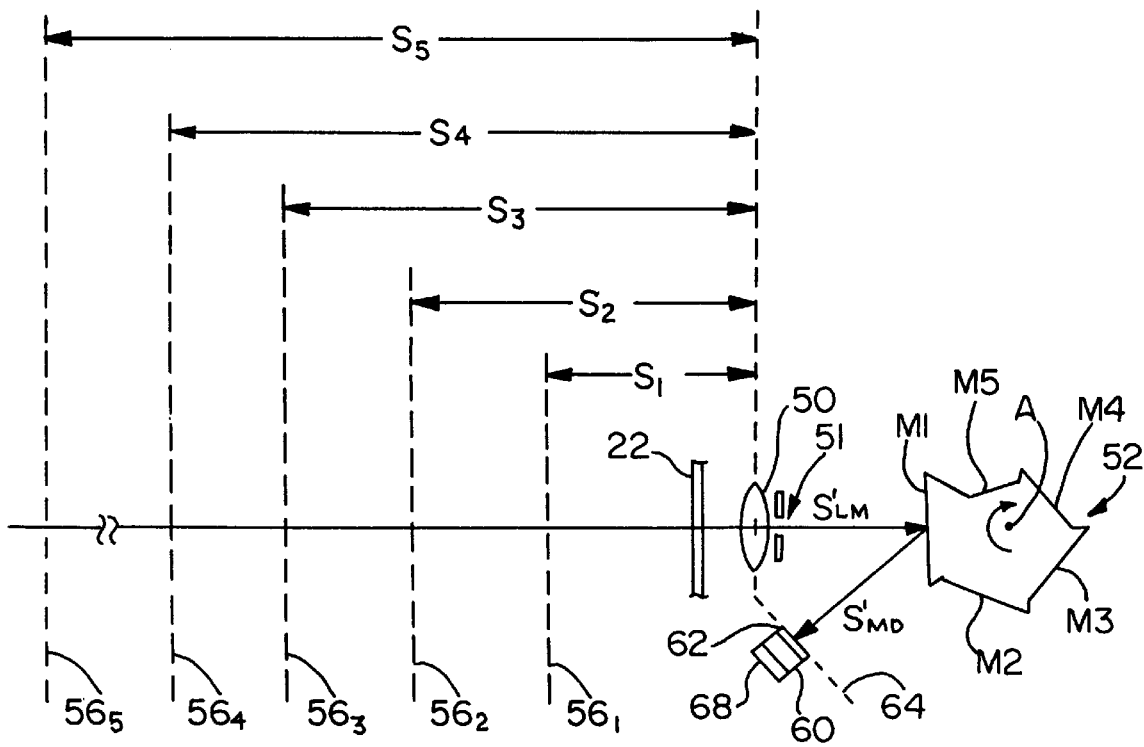
FIG. 6 is a schematic diagram of the optical head unit in relation to the resultant object plane distance in accordance with the present invention.

FIG. 6 illustrates the manner in which the rotation of the mirrored spinner 52 alters the object distance of the optical reader 10 between $s_1$–$s_5$ as the spinner 52 rotates in addition to causing the image of the bar code symbol 26 to be swept across the photodetector 60. The speed of rotation of the mirrored spinner 52 is controlled so as to enable the decoder 34 to have adequate time to process the signal from each mirrored face M1–M5 before encountering the next mirrored face. An exemplary rotational speed of the spinner 52 may be 360 rpm (or scans per second) using conventional decoders.

In operation, the bar code symbol 26 is not likely to be located at the exact location of one of the image planes $56_1$–$56_5$ formed by the respective mirrored faces M1–M5. However, the minimum object distance (e.g., $s_1$) and the maximum object distance (e.g., $s_5$) can be selected to encompass the minimum and maximum distances at which the optical reader 10 will be expected to read the bar code label 26. In addition, a sufficient number of intermediate object planes (e.g., associated with object distances $s_2$–$s_4$) may be selected by the use of a corresponding number of mirrored faces on the mirrored spinner 52 at respective radii.

Although the bar code symbol 26 will not be precisely in focus at the image plane 64 unless it is located exactly at one of the specified object distances $s_1$–$s_5$, the optical elements and distances are selected such that at least one of the mirrored faces will result in the bar code symbol 26 being imaged at the image plane 64 with sufficient resolution or focus to allow the image to be decoded by the decoder 34. In this sense, the decoder 34 is continuously attempting to decode the output of the photodetector 60 as the mirrored spinner 52 rotates. As long as one of the mirrored faces M1–M5 results in the bar code symbol 26 being imaged at the image plane 64 with sufficient resolution, the bar code symbol 26 may be read and decoded. The images without sufficient resolution which may result from the other mirrored faces are in essence ignored by the decoder 34 as a result of the inability to decode the output of the photodetector 60.

By selectively choosing the number of mirrored faces and the respective image distances s', the probability that at least one of the images of the bar code symbol 26 will be successfully decoded regardless of its exact position relative to the optical reader 10 is quite high. Even still, if an operator has difficulty getting the optical reader to decode the bar code symbol 26, the operator may be instructed to move the optical reader 10 slightly towards or away from the bar code symbol. Because the optical reader 10 varies its object distance as a result of the mirrored spinner 52, the bar code symbol 26 may be quickly imaged and decoded.

Although the invention has been shown and described with respect to certain preferred embodiments, it is obvious that equivalents and modifications will occur to others skilled in the art upon the reading and understanding of the specification. For example, the mirrored spinner and imaging lens could be combined in the form of parabolic reflectors at each mirrored face. In addition, or in the alternative, each mirrored face may have a curvature to improve magnification. The present invention includes all such equivalents and modifications, and is limited only by the scope of the following claims.

What is claimed is:

1. An optical reader for reading optical indicia, comprising:

an imaging element for forming an image of the optical indicia;

a photodetector element having an aperture with a width smaller than the width of a smallest element in the image to be discerned by the optical reader; and means for causing the image to be swept past the aperture to produce an output of the photodetector indicative of the optical indicia.

2. The optical reader of claim 1, wherein the means for causing the image to be swept comprises a rotating mirror element.

3. The optical reader of claim 1, wherein the imaging element comprises an imaging lens.

4. The optical reader of claim 1, wherein the optical indicia is a bar code symbol and the width of the aperture is less than the width of the smallest bar width in the image.

5. The optical reader of claim 1, further comprising means for varying with respect to time the image distance of the imaging element relative to the photodetector.

6. An optical reader for reading optical indicia, comprising:

an imaging element for forming an image of the optical indicia at an image plane defined in relation to the location of a photodetector; and an optical element which varies an image distance between the imaging element and the photodetector with respect to time to correspondingly vary an object distance at which the optical indicia is located from the imaging element in order that the image is focused at the image plane.

7. The optical reader of claim 6, wherein the imaging element is a lens.

8. The optical reader of claim 6, wherein the optical element comprises a spinner mirror with a plurality of mirrored faces.

9. The optical reader of claim 8, wherein the spinner mirror is located along the optical axis of the imaging element.

10. The optical reader of claim 9, wherein the mirrored faces are located at respective different distances from the imaging element when aligned with the optical axis of the imaging element.

* * * * *